US012626134B2

(12) United States Patent
Park et al.

(10) Patent No.: US 12,626,134 B2
(45) Date of Patent: May 12, 2026

(54) METHOD AND APPARATUS FOR LIGHTWEIGHTING OF ARTIFICIAL INTELLIGENCE MODEL

(71) Applicant: SqueezeBits Inc., Seoul (KR)

(72) Inventors: Eunhyeok Park, Gyeongsangbuk-do (KR); Taesu Kim, Seoul (KR); Changhun Lee, Busan (KR); Hyungjun Kim, Seoul (KR); Jungyu Jin, Gyeongsangbuk-do (KR)

(73) Assignee: SqueezeBits Inc., Seoul (KR)

( * ) Notice: Subject to any disclaimer, the term of this patent is extended or adjusted under 35 U.S.C. 154(b) by 0 days.

(21) Appl. No.: 18/957,896

(22) Filed: Nov. 25, 2024

(65) Prior Publication Data

US 2025/0217651 A1     Jul. 3, 2025

(30) Foreign Application Priority Data

Dec. 28, 2023     (KR) ........................ 10-2023-0194111

(51) Int. Cl.
*G06N 3/082* (2023.01)
*G06N 3/0495* (2023.01)

(52) U.S. Cl.
CPC ........... *G06N 3/082* (2013.01); *G06N 3/0495* (2023.01)

(58) Field of Classification Search
None
See application file for complete search history.

(56) References Cited

U.S. PATENT DOCUMENTS

| | | | | | |
|---|---|---|---|---|---|
| 2020/0264876 A1* | 8/2020 | Lo | ........................... | G06N 3/063 |
| 2022/0092382 A1* | 3/2022 | Moshovos | ............... | G06N 3/04 |
| 2023/0325656 A1* | 10/2023 | Li | ........................... | G06N 3/09 |
| 2024/0403644 A1* | 12/2024 | Shafipour | ........... | G06N 3/0495 |

FOREIGN PATENT DOCUMENTS

| | | | | |
|---|---|---|---|---|
| KR | 10-2019-0076916 A | 7/2019 | | |
| KR | 10-2023-0071161 A | 5/2023 | | |
| WO | WO-2020014590 A1 * | 1/2020 | ............. | G06F 17/16 |

OTHER PUBLICATIONS

Shen et al., Q-Bert: Hessian Based Ultra Low Precision Quantization of BERT, Proceedings of the AAAI Conference on Artificial Intelligence, (2020) (Year: 2020).*
Yuan et al., "ASVD: Activation-aware Singular Value Decomposition for Compressing Large Language Models", (Dec. 10, 2023) (Year: 2023).*
Bodarenko et al., "Understanding and Overcoming the Challenges of Efficient Transformer Quantization" (2021) (Year: 2021).*
Park et al., "Energy-efficient Neural Network Accelerator Based on Outlier-aware Low-precision Computation", (2018) (Year: 2018).*

(Continued)

*Primary Examiner* — Usmaan Saeed
*Assistant Examiner* — Beatriz Ramirez Bravo
(74) *Attorney, Agent, or Firm* — Nicholas Park

(57) ABSTRACT

The disclosure relates to a method and an apparatus for lightweighting of artificial intelligence models, and the method of lightweighting of artificial intelligence models includes identifying an outlier in an input vector of a layer, identifying at least one column corresponding to the outlier in a weight matrix, and quantizing weight values of columns which do not correspond to the outlier.

9 Claims, 11 Drawing Sheets

Input $X$     Weight $W$     Output $Y = W \cdot X$ $N_{samples}$     $C_{in}$ $C_{in}$     $C_{out}$ activation outlier 611     weak column 612

Hessian $H_E = 2X \cdot X^T$ $C_{in}$ $C_{in}$

= sensitive channel 613

(56) References Cited

OTHER PUBLICATIONS

Liu et al., "QLLM: Accurate and Efficient Low-Bitwidth Quantization for Large Language Models" (Oct. 12, 2023) (Year: 2023).*
Xiuying Wei et al., "Outlier Suppression: Accurate quantization of large language models by equivalent and effective shifting and scaling" (Oct. 23, 2023) (Year: 2023).*
KIPO, Notice of Refusal to Grant a Patent for Application No. 10-2023-0194111, Mar. 21, 2024.
KIPO, Decision to Grant a Patent for Korean Patent Application No. 10-2023-0194111, Sep. 24, 2024.

* cited by examiner

401 weak column 402 quantized column 403 acquire input data vector ⟋701 perform calculations for first partial vector corresponding to quantized column ⟋702 perform calculations for second partial vector corresponding to weak column ⟋703 add up results of calculations for first partial vector and second partial vector ⟋704

1

METHOD AND APPARATUS FOR LIGHTWEIGHTING OF ARTIFICIAL INTELLIGENCE MODEL

CROSS-REFERENCE TO RELATED APPLICATION

The present application claims priority to Korean Patent Application No. 10-2023-0194111, filed on Dec. 28, 2023, the entire contents of which is incorporated herein for all purposes by this reference.

BACKGROUND

Technical Field

The disclosure relates to a method and an apparatus for lightweighting of artificial intelligence models and, more particularly, to a method and an apparatus for quantizing weights constituting artificial intelligence models.

Description of Related Art

A large language model (LLM) is a type of artificial intelligence models that process natural language data and corresponds to an artificial intelligence model that generates responses similar to those generated by humans. The LLM is constructed using a deep learning technology and may be trained using a huge amount of text data. The LLM has recently attracted a lot of attention in a natural language processing field, and a representative LLM is a chat generative pre-trained transformer (GPT)-3. The LLM is trained using a huge amount of learning data sets and thus understands the structure and meaning of language. The LLM has a capability of detecting a pattern of text and a language rule and generating or understanding new text, based thereon. By using such a characteristic, the LLM may be used for various purposes of machine translation, automatic text summarization, question and answer, dialog system, content generation, and the like.

SUMMARY

The disclosure intends to provide a method and an apparatus for lightweighting of artificial intelligence models.

Further, the disclosure intends to provide a method and an apparatus for selectively quantizing weights of artificial intelligence models.

According to an embodiment of the disclosure, the disclosure is invention for a method of lightweighting of artificial intelligence models, and includes identifying an outlier in an input vector of a layer, identifying at least one column corresponding to the outlier in a weight matrix, and quantizing weight values of columns which do not correspond to the outlier.

According to an embodiment of the disclosure, the disclosure is invention for a method of identifying an outlier in an input vector of a layer, and includes identifying at least one element having a value larger than or equal to a threshold compared to an average of values of elements included in the input vector.

According to an embodiment of the disclosure, the disclosure is invention for a method of identifying an outlier in an input vector of a layer, and includes generating a Hessian value by using the input vector, determining sensitivity for each channel, based on the Hessian value, and determining a weak column corresponding to the outlier, based on the sensitivity for each channel.

According to an embodiment of the disclosure, the disclosure is invention for a Hessian value and sensitivity for each channel, the Hessian value is determined based on product of an input vector and transpose of the input vector, and the sensitivity for each channel is determined based on a diagonal component of the Hessian value and a difference between weight values before and after quantization of a corresponding channel.

According to an embodiment of the disclosure, the disclosure is invention for a method of processing input data by using lightweight artificial intelligence models, and includes acquiring an input data vector, dividing the input data vector into a first partial vector corresponding quantized columns of a weight matrix and a second partial vector corresponding to at least one weak column of the weight matrix, performing calculations for the first partial vector by using the quantized columns, performing calculations for the second partial vector by using the at least one weak column, and adding up results of the calculations for the first partial vector and the second partial vector, the weight matrix comprises weights of at least one column corresponding to an outlier in the input data vector and weights of at least one remaining column, and bit precision between the weights of the at least one column corresponding to the outlier in the input data and bit precision between the weights of the at least one remaining column are different from each other.

According to an embodiment of the disclosure, the disclosure is invention for an input data vector, the input data vector is processed by a processor capable of performing N-parallel calculations, N calculations performed in parallel have indexes 0 to N, and calculations of indexes smaller than a size of an outlier vector corresponding to the outlier in the input data vector are allocated to process the outlier vector.

According to an embodiment of the disclosure, the disclosure is invention for a method of performing calculations for the first partial vector, and includes dequantizing weights included in the quantized columns and performing a matrix multiplication between the dequantized weights and the first partial vector.

According to an embodiment of the disclosure, the disclosure is invention for a weight matrix, and the weight matrix is stored as a first partial matrix constituted by the quantized columns, a second partial matrix constituted by the weak columns, indexes of the columns constituting the first partial matrix, and indexes of the columns constituting the second partial matrix.

According to an embodiment of the disclosure, the disclosure is invention for an apparatus for lightweighting of artificial intelligence models, and includes a storage unit and a processor, and the processor is configured to identify an outlier in an input vector of a layer, identify at least one column corresponding to the outlier in a weight matrix, and quantize weight values of columns which do not correspond to the outlier According to an embodiment of the disclosure, the disclosure is invention for an apparatus for processing input data, and includes a storage unit and a processor, and the processor is configured to acquire an input data vector, divide the input data vector into a first partial vector corresponding quantized columns of a weight matrix and a second partial vector corresponding to at least one weak column of the weight matrix, perform calculations for the first partial vector by using the quantized columns, perform calculations for the second partial vector by using the at least one weak column, and add up results of the calculations for the first partial vector and the second partial vector, the weight matrix comprises weights of at least one column corresponding to an outlier in the input data vector and weights of at least one remaining column, and bit precision between the weights of the at least one column and bit precision between the weights of the at least one remaining column are different from each other.

It is possible to effectively make artificial intelligence models lightweight by providing a method and an apparatus for determining the kernel size to change the structure of artificial intelligence models.

Further, it is possible to determine the more efficient and better performance kernel than manually designating the kernel size by humans by proposing a method and an apparatus for automatically searching for the optimal kernel size through learning.

DETAILED DESCRIPTION

Figure 1:
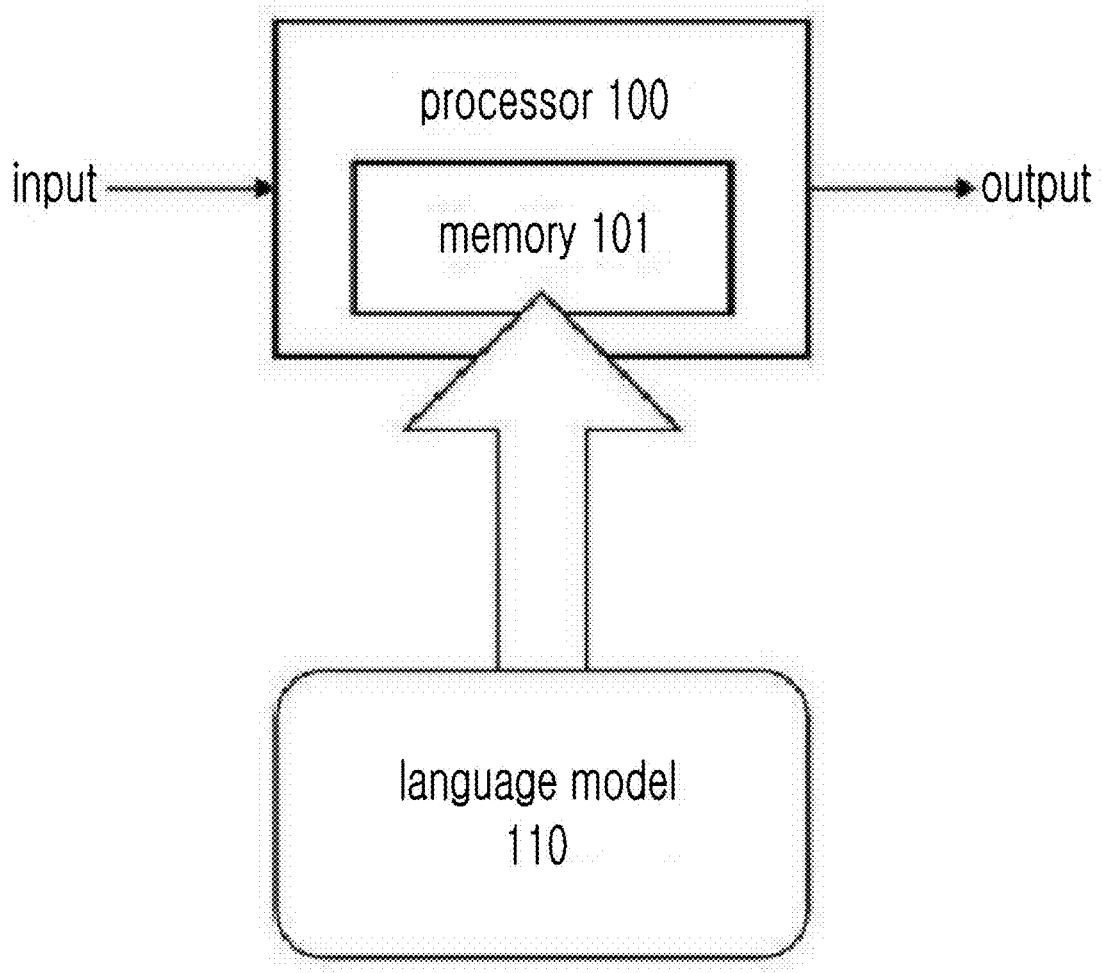
FIG. 1 illustrates an example of a situation in which an artificial intelligence model is uploaded to a processor according to an embodiment of the disclosure.

The advantages and features of the disclosure, and methods for achieving the same may become clearer with reference to embodiments described in detail along with the accompanying drawings. However, the disclosure is not limited to embodiments suggested below, but may be implemented in various different forms and should be understood as including all transforms included in the idea and technical range of the disclosure, equivalents, and substitutes.

Embodiments suggested below make the disclosure complete and are provided to completely inform those skilled in the art to which the disclosure belongs of the range of the disclosure. In description of the disclosure, when it is determined that the detailed description of the relevant known art may obscure the gist of the disclosure, detailed description thereof will be omitted.

The terms used in this application is used to describe particular embodiments only and is not intended to be limiting of the disclosure. Singular forms include plural forms unless the context clearly indicates otherwise. In this application, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In an embodiment of the disclosure, "communication", "communication network", and "network" may be used as the same meaning. The three terms may include a wired/wireless short-range and wide-area data transmission and reception network which may transmit and receive files between user terminals, terminals of different users, and download servers.

Hereinafter, embodiments of the disclosure are described in detail with reference to the accompanying drawings, the same reference numeral is assigned to the same or corresponding element in description made with reference to the accompanying drawings, and overlapping description thereof is omitted.

A language model that is one type of artificial intelligence models has the excellent performance in language generation and various fields based on the large model size and data. Despite of the good performance, the language model cannot be uploaded to one of graphic processing units (GPUs) for general users and GPUs for some servers due to high memory requirements.

FIG. 1 illustrates an example of a situation in which an artificial intelligence model is updated to a processor according to an embodiment of the disclosure. Referring to FIG. 1, when a language model 110 is updated to an internal memory 101 of a processor 100 (for example, a GPU), the processor 100 may perform an inference or prediction operation of generating output data from input data by using the language model 110. However, when an amount of data of the language model 110 is larger than a storage capacity of the memory 101, the processor 110 cannot use the language model 110 alone, and interworking of a plurality of processors is needed. However, when a plurality of processors interworks, resource consumption and delay for communication between the processors may be generated.

Meanwhile, in an inference process, most of the memory usage occurs by the part that the memory should have model weights during calculations. Accordingly, it is required to reduce the capacity occupied by the model weights in the memory. As a representative method of reducing the capacity of the model weights, there is a method of reducing bit precision of weights, for example, a quantization method. When 16 bit/parameter (fp16) corresponding to the generally used bit precision is reduced to 3 bit/parameter, the storage space becomes about ⅕ compared to fp16. However, when the bit precision is reduced, a range of expressible numbers is also reduced, which may lead to a decrease in the model inference performance.

Therefore, the disclosure proposes a mixed-precision scheme that maintains fp16 bit precision in columns of some weights which are weak or sensitive to quantization and applies quantization to the remaining columns. To this end, the disclosure describes a technology of selecting a weight column weak at quantization and applying quantization of weights to the remaining columns, rather than to the selected column.

Figure 2:
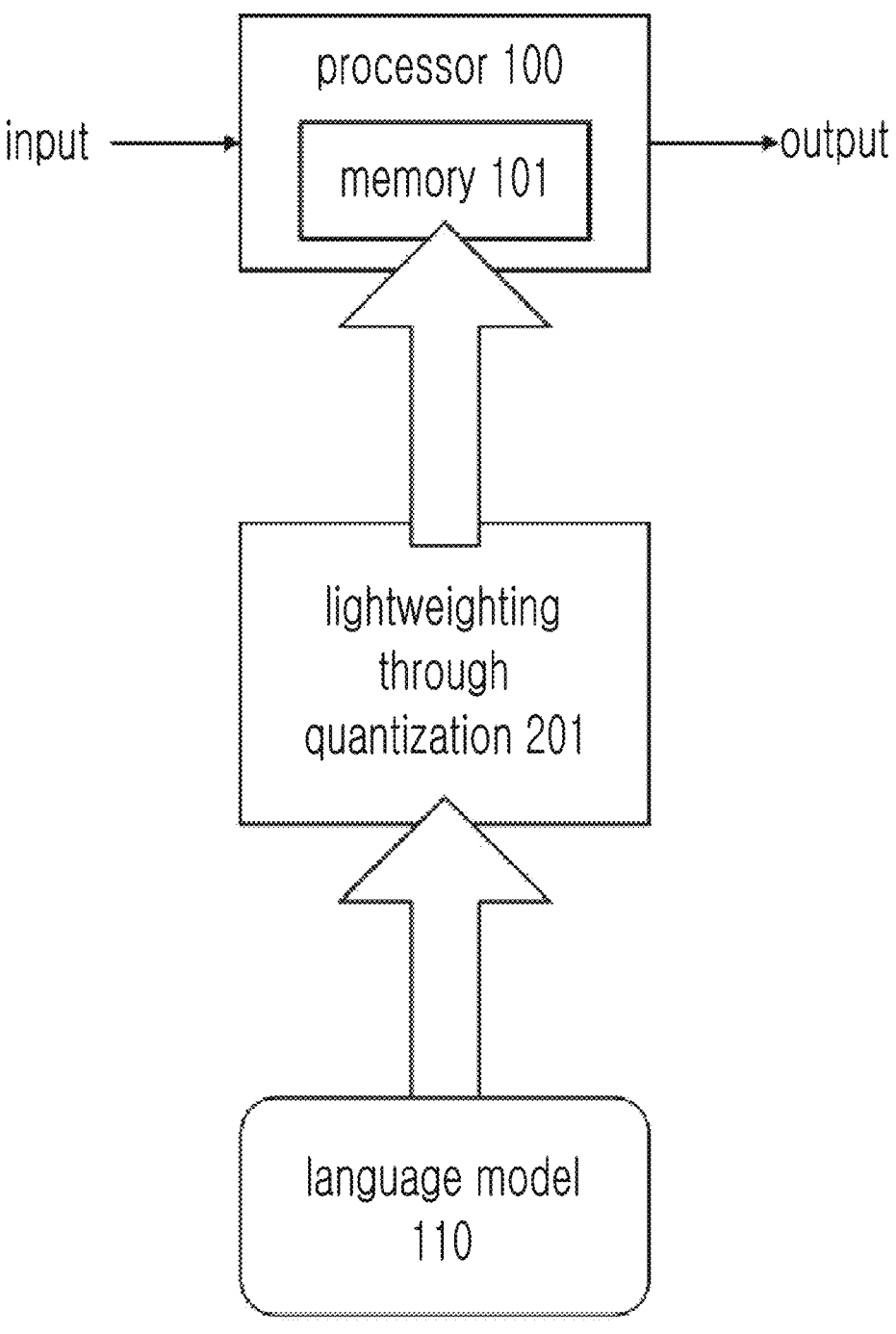
FIG. 2 illustrates an example of a situation in which quantized artificial intelligence models are updated to the processor according to an embodiment of the disclosure.

FIG. 2 illustrates an example of a situation in which quantized artificial intelligence models are updated to the processor according to an embodiment of the disclosure. As illustrated in FIG. 2, the language model 110 becomes lightweight via a lightweight procedure 201 through quantization and then is updated to the memory 101. Accordingly, artificial intelligence models having a smaller amount of data may be provided. At this time, the lightweight procedure 201 through quantization may be performed in real time or may be performed in advance. When it is performed in advance, a device that performs the lightweight procedure 201 and a device that performs interference or prediction by using the processor 110 may be different from each other.

Figure 3:
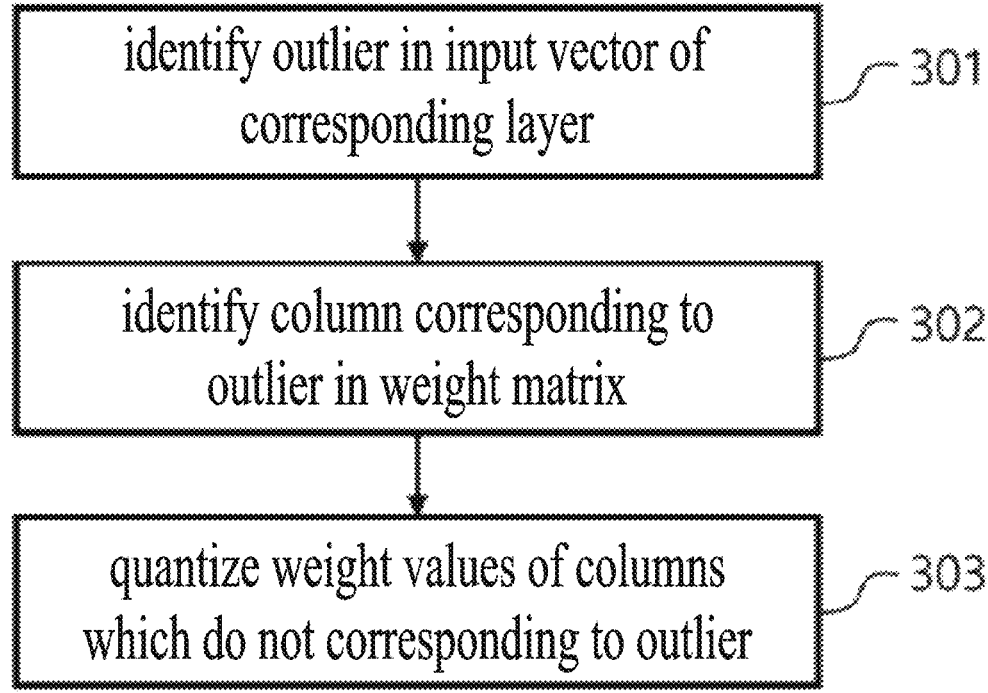
FIG. 3 is a flowchart illustrating a method of quantizing weights of artificial intelligence models according to an embodiment of the disclosure.

(Embodiment 1) FIG. 3 is a flowchart illustrating a method of quantizing weights of artificial intelligence models according to an embodiment of the disclosure. Referring to FIG. 3, the method of quantizing weights of artificial intelligence models includes a step 301 of identifying an outlier in input vectors of a corresponding layer, a step 302 of identifying a column corresponding to the outlier in a weight matrix, and a step 303 of quantizing weight values of columns that do not correspond to the outlier. The flowchart of FIG. 3 may be applied to one layer in an artificial intelligence model. Accordingly, when an artificial intelligence model is constituted by a plurality of layers, the method of FIG. 3 may be repeatedly applied to at least some of the plurality of layers.

Figure 4:
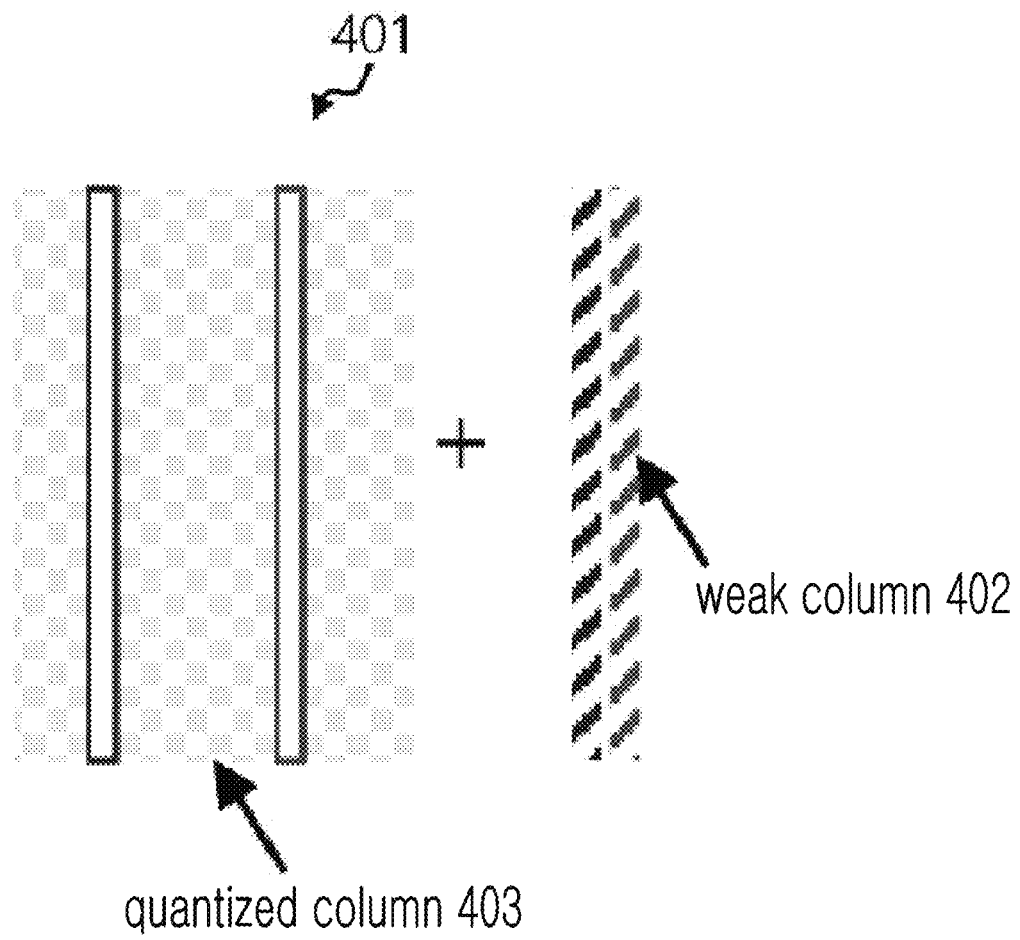
FIG. 4 illustrates an example of the selection result of weight columns sensitive to quantization in artificial intelligence models according to an embodiment of the disclosure.

Weights of artificial intelligence models may be expressed and stored in a matrix form. FIG. 4 illustrates an example of a selection result of weight columns sensitive to quantization in artificial intelligence models according to an embodiment of the disclosure. Referring to FIG. 4, a matrix 401 means weights belonging to one layer. When input values are provided to the corresponding layer in a vector form, the input values are multiplied by the matrix 401, and the result thereof is provided to the next layer. At this time, each of the columns belonging to the matrix 401 is the weight. Some of the plurality of weight columns (two columns in the case of FIG. 4) belonging to the matrix 401 are selected as columns 402 weak at quantization, and values of the remaining columns 403 may be quantized.

As a result, columns constituting the weight matrix according to the disclosure are classified into two types. The two types are separated according to a quantization degree, in other words, the number of bits for expressing each value. Specifically, columns within the weight matrix are divided into a first column set having values expressed by the number of first bits (that is, quantized) and a second column set having values expressed by the number of second bits (that is, non-quantized). According to another embodiment, the weight matrix may be constituted by three or more column sets expressed by three or more different numbers of bits.

Here, a weak column may be selected according to one of various methods. It is preferable to select the weak column such that the performance decrease due to quantization of the weights is minimum. From this perspective, according to an embodiment of the disclosure, a method based on an activation outlier may be used as one method of selecting the weak column.

The activation outlier is an element having a significantly large value compared to other values in the input vector multiplied by the weight matrix. The outlier is generated according to the training result of the language model, and is seen during a process of using the language model for inference or prediction after training the language model, and it is possible to detect the location of a channel in which the activation outlier is generated through various methods. Since a column multiplied with the activation outlier among the columns of the weight matrix greatly influences an output value later, it may be preferable to select the corresponding column as a weak column.

That is, it has been known that an outlier having a very large absolute value is generated in a specific channel of activation in the language model. Accordingly, when weights are quantized, even a small error in a weight column corresponding to the activation channel having the outlier may give a large change to a result value after the multiplication of the weight matrix. Accordingly, when top k specific channels in a descending order of the outlier are identified, k weight columns corresponding to the corresponding channels are selected as weak columns. The top k weak columns are preserved as the original precision (for example, 16-bit precision), and the remaining columns are quantized with targeted bit-precision.

(Embodiment 2-1) according to an embodiment of the disclosure, a channel having an outlier may be identified through observation. In a process of training or interfering/predicting artificial intelligence models, it is possible to detect the location at which the outlier is generated by extracting input vectors input into a layer and identifying a value of each element of the extracted input vectors. For example, based on values of the elements, the location of at least one element having a large value larger than or equal to a threshold compared to an average of the values of all elements may be determined as the channel having the outlier.

(Embodiment 2-2) according to an embodiment of the disclosure, the channel having the outlier may be identified using a Hessian value of the corresponding layer. A method of searching for the channel having the outlier by using the Hessian value is described below.

Figure 5:
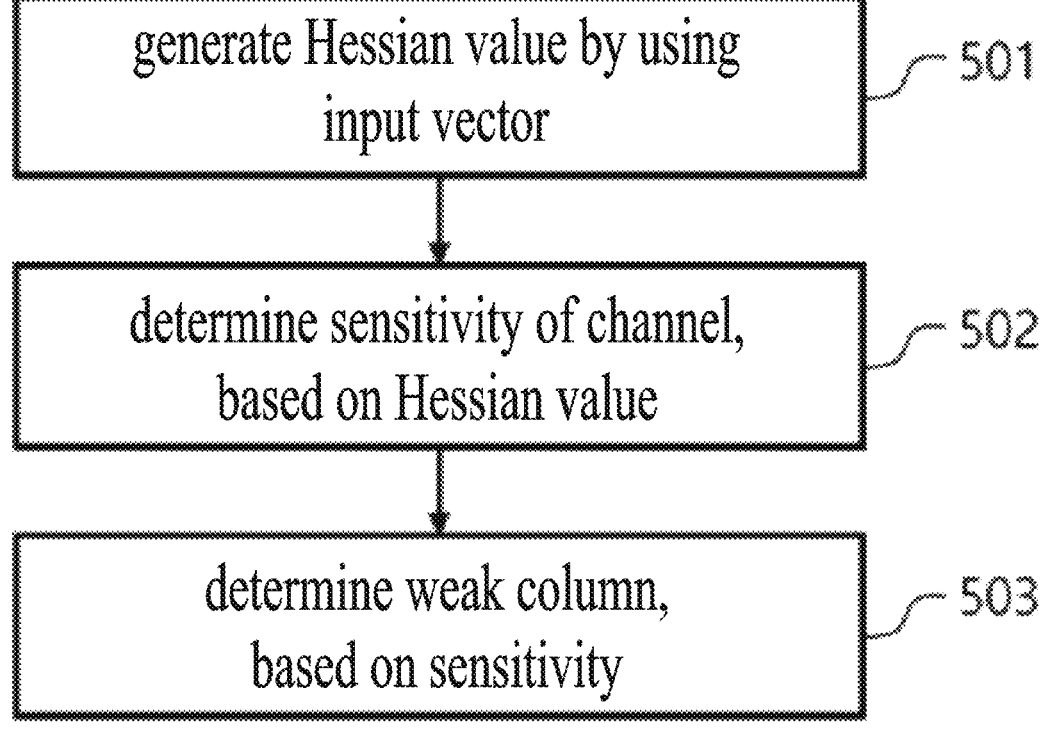
FIG. 5 is a flowchart illustrating a method of selecting some weights to be quantized among weights of artificial intelligence models according to an embodiment of the disclosure.

FIG. 5 is a flowchart illustrating a method of selecting some weights to be quantized among weights of artificial intelligence models according to an embodiment of the disclosure. Referring to FIG. 5, the method of selecting some weights to be quantized may include a step 501 of generating a Hessian value by using input vectors, a step 502 of determining sensitivity of a channel, based on the Hessian value, and a step 503 of determining a weak column, based on the sensitivity. The flowchart of FIG. 5 may be applied to one layer in artificial intelligence models. Accordingly, when an artificial intelligence model is constituted by a plurality of layers, the method of FIG. 5 may be repeatedly applied to at least some of the plurality of layers.

When weights of layers are quantized, the goal is to minimize an error (for example, E in [Equation 1] below) corresponding to difference in layer outputs before and after quantization. At this time, the error E may be expressed as a sum of respective output channel differences as shown in [Equation 1].

$$E = \|WX - \hat{W}X\|_2^2 = \sum_{i=1}^{c_{out}} \|W_{i,:}X - \hat{W}_{i,:}X\|_2^2 \qquad \text{[Equation 1]}$$

W denotes a weight matrix, X denotes input data, $\hat{W}$ denotes a quantized weight matrix, $C_{out}$ denotes the number of rows in the weight matrix, and $W_{i,:}$ denotes an $i^{th}$ row in the weight matrix.

Figure 6:
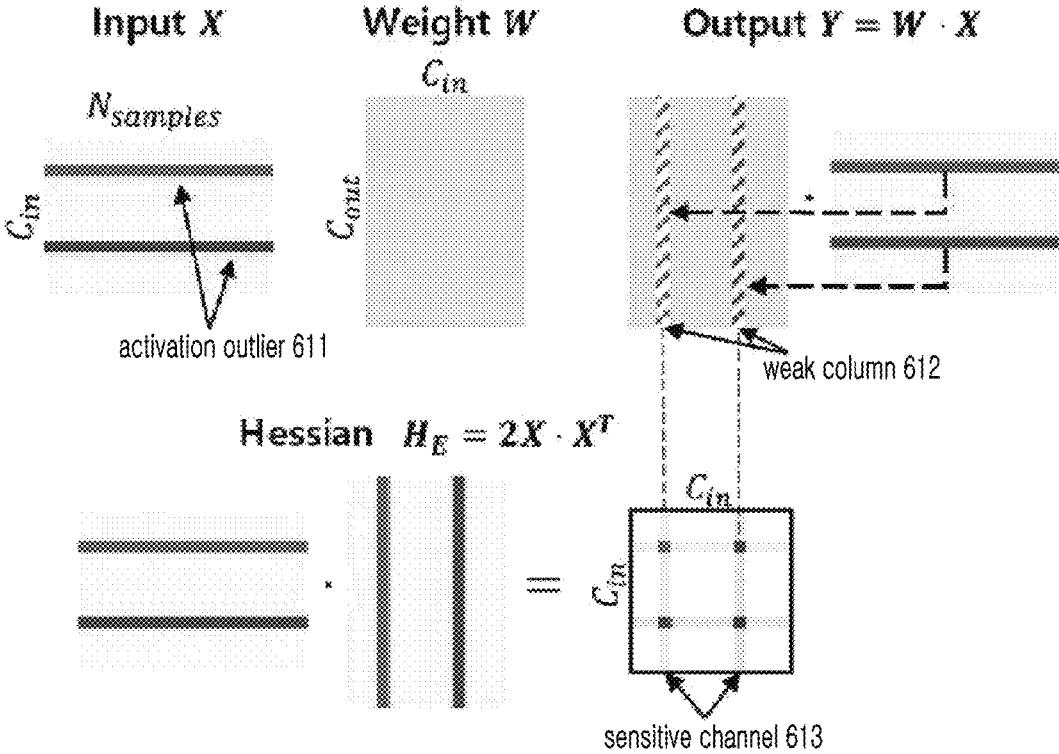
FIG. 6 illustrates a process of selecting weak columns by using Hessian according to an embodiment of the disclosure.

Hessian indicates sensitivity for quantization loss through second derivative for a weight of a loss function E. Referring to FIG. 6, Hessian may be calculated based on the product of input data X including the activation outlier 611 and the transpose of X. In expression through an equation, a Hessian value H of a specific layer may be calculated as shown in [Equation 2] below.

$$H = H_i = \frac{\partial^2 E}{\partial W_{i}^2} = 2XX^T \qquad \text{[Equation 2]}$$

Due to a diagonal component $H_{j,j}$ of Hessian and quantization, the sensitivity can be defined as follows by using a normalized value $$\|\Delta W_{i,j}\|_2^2$$

of the error for each channel in the weight. Accordingly, a sensitivity channel 313 may be identified as illustrated in FIG. 6. When weight channels are arranged in a descending order according to a sensitivity value for each channel, top n weight channels may be defined as weak columns 612. In [Equation 3] below, j is a channel index.

$$\Delta W_{:,j} - \hat{W}_{:,j} \qquad \text{[Equation 3]}$$

$$\text{sensitivity}_j = H_{j,j}\|\Delta W_{:,j}\|_2^2$$

As shown in [Equation 3] above, sensitivity for each channel is determined based on the diagonal component of the Hessian value and the difference between weight values before and after quantization of the corresponding channel.

As described above, the weak columns may be selected and the remaining columns except for the weak columns may be quantized. Accordingly, the weight matrix may be configured in the quantized form except for some columns, and inference or prediction calculations using the same may be performed as follows.

Figure 7:
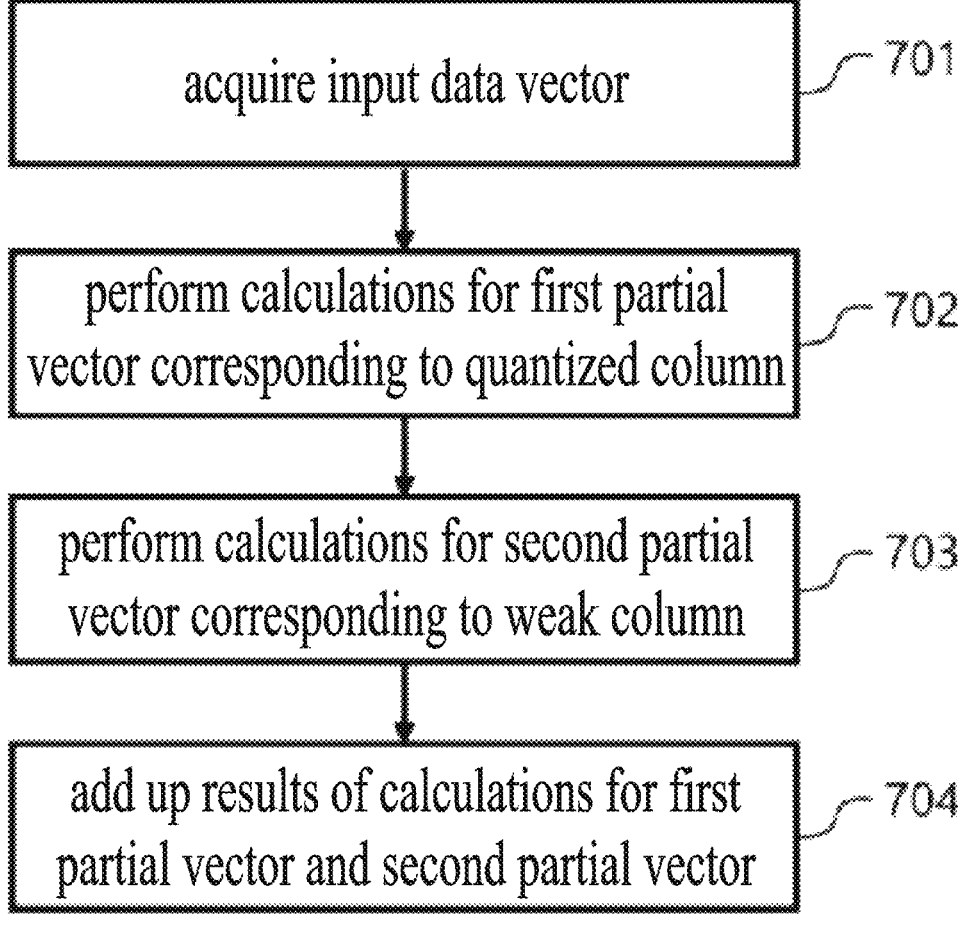
FIG. 7 is a flowchart illustrating a method of processing input data by using quantized artificial intelligence models according to an embodiment of the disclosure.

(Embodiment 3-1) FIG. 7 is a flowchart illustrating a method of processing input data by using quantized artificial intelligence models according to an embodiment of the disclosure. Referring to FIG. 7, the method of processing input data includes a step 801 of acquiring input data vectors, a step 802 of performing calculations for a first partial vector corresponding to a quantized column, a step 803 of performing calculations for a second partial vector corresponding to a weak column, and a step 804 of adding up results of the calculations for the first partial vector and the second partial vector. The flowchart of FIG. 7 may be applied to one layer in artificial intelligence models. Accordingly, when an artificial intelligence model is constituted by a plurality of layers, the method of FIG. 7 may be repeatedly applied to at least some of the plurality of layers.

Figure 8A:
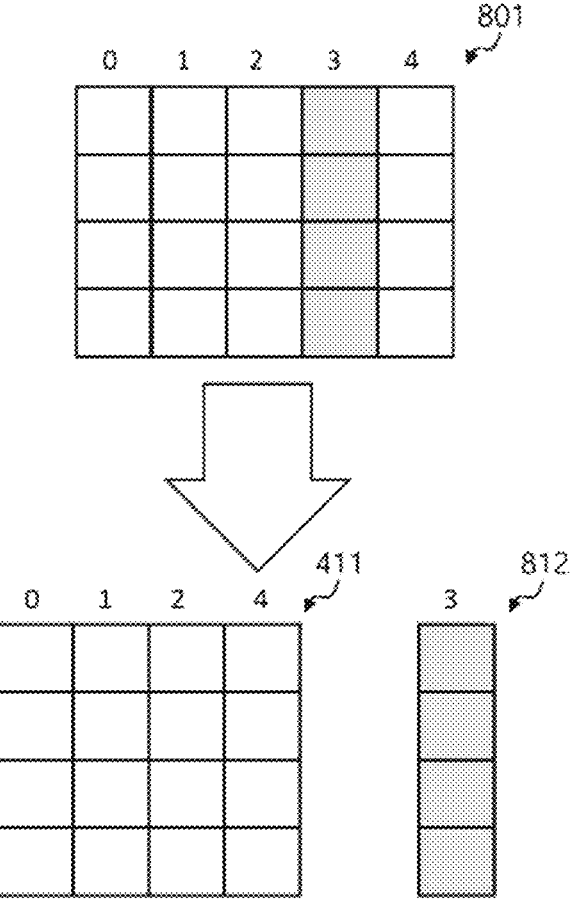
FIGS. 8A and 8B illustrate the structure in which a quantized weight matrix is stored and used according to an embodiment of the disclosure.
Figure 8B:
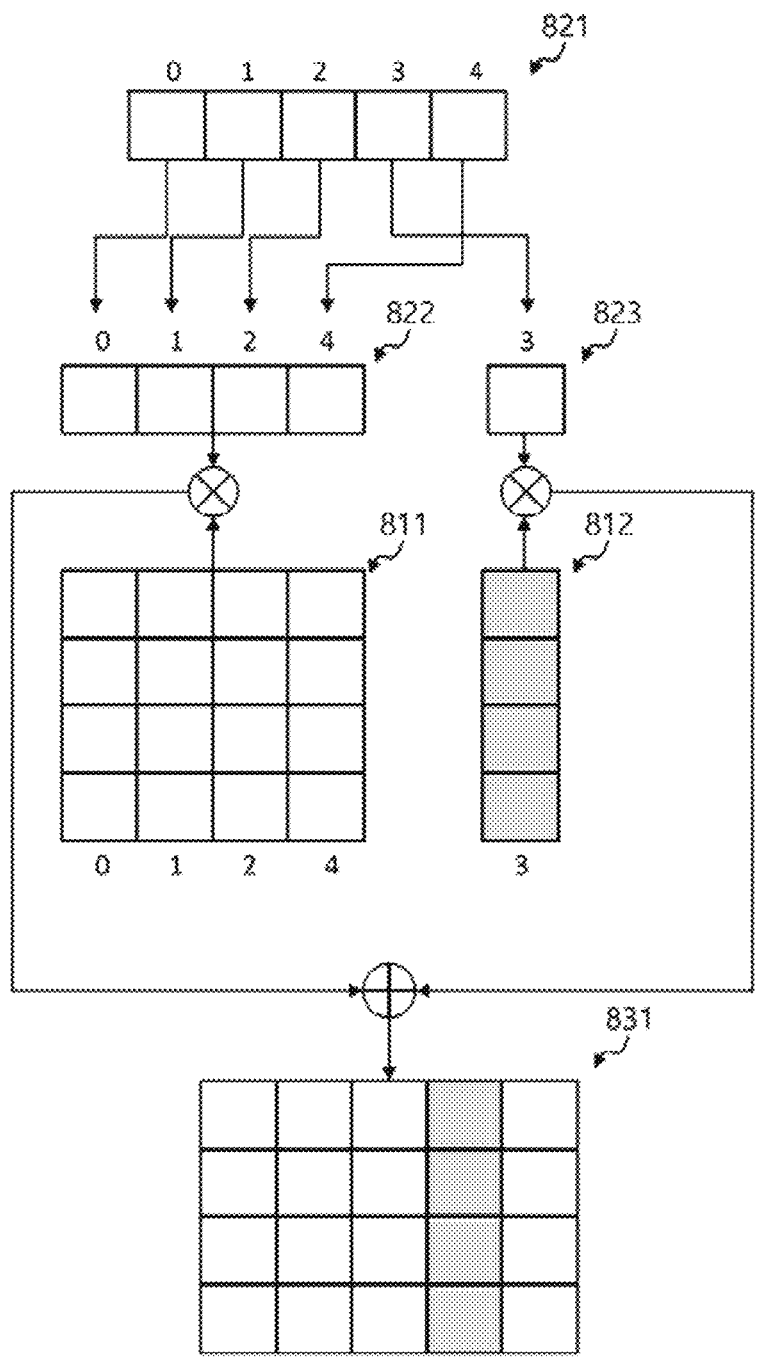

More specifically, the weight matrix may be stored in the structure as illustrated in FIG. 8A to be used for inference calculations and may be used as illustrated in FIG. 8B.

FIGS. 8A and 8B illustrate the structure in which a quantized weight matrix is stored and used according to an embodiment of the disclosure. FIGS. 8A and 8B show an example of a weight matrix including five columns, each of which is constituted by four elements for convenience of description. However, the weight matrix may have more rows and columns.

FIG. 8A shows the case where a column of index 3 is selected as a weak column among five columns of the weight matrix by way of example. Referring to FIG. 8A, except for the column of index 3, elements of columns of indexes 0, 1, 2, and 4 are quantized to be expressed by the smaller number of bits. Accordingly, the columns of indexes 0, 1, 2, and 4 and the column of index 3 have different precision. Since the precision is different, it is more easy to group and multiply columns having the same precision rather than processing the five columns as one matrix multiplication. Accordingly, the weight matrix in which some columns are quantized may be divided into two sub-matrixes 811 and 812 and then stored. In other words, the weight matrix may be stored as a first sub-matrix 811 constituted by quantized columns, a second sub-matrix 812 constituted by weak columns, indexes of the columns constituting the first sub-matrix 811, and indexes of the columns constituting the second sub-matrix 812.

Accordingly, when input vectors are provided, the two sub-matrixes 811 and 812 may be used for calculations as illustrated in FIG. 8B. As illustrated in FIG. 8B, when an input vector 821 having a length of 5 is provided, zeroth, first, second, and fourth elements 822 may be multiplied by the first sub-matrix 811 including quantized columns, and the remaining third element 823 may be multiplied by the second sub-matrix 812 including non-quantized columns, and then results of multiplication with respective sub-matrixes are added up and output data 831 corresponding to the weight matrix 801 may be generated. That is, the output of one layer may be determined by calculations of two matrix multiplications and one sum.

As described above, the weight matrix may be divided into a plurality of sub-matrixes and then stored according to whether quantization is performed, and a calculation process may become different from the existing calculation process according thereto. Accordingly, the disclosure proposes the following GPU kernel for efficient calculations.

In order to efficiently use the proposed idea for the GPU, a dedicated kernel may be needed. When there is no dedicated kernel, a situation where the outlier (for example, fp16) is very inefficiently calculated may occur. In general, the GPU that is widely used for a language model may not support calculations between different types of bit precision. Accordingly, the kernel may be implemented to use weight 4 bit integer, activation 16 bit floating point (hereinafter, referred to as "W4A16") reference, and FP16 calculator of the GPU (for example, Tensor core). Hereinafter, the kernel for efficient calculations proposed in the disclosure is referred to as a "W4A16 kernel".

(Embodiment 3-2) the calculation order of the W4A16 kernel is described below.

1. A 4-bit weight is copied from a CPU memory (hereinafter, referred to as "host") to a GPU memory (hereinafter, referred to as a "device").
2. Scale and bias (fp16) of the 4-bit weight are copied from the host to the device.
3. A fp16 outlier weight is copied from the host to the device.
4. A fp16 input vector is separated from an outlier input vector (for example, 423 of FIG. 8B) and a normal input vector (for example, 422 of FIG. 8B) according to a predetermined outlier index.
5. Each of the outlier input vector and the normal input vector are copied from the host to the device.

6. Matrix multiplication is performed. According to the given input/weight size, separation into N calculations is performed and repeatedly performed as follows.
    (1) The 4-bit weight is dequantized to fp16 in the GPU. That is, through calculations such as [4-bit weight]*[fp16 scale]+[fp16 bias], the 4-bit weight may be converted into a weight in a format of fp16.
    (2) A matrix multiplication calculation between the weight dequantized in the GPU and the normal input vector is performed.
    (3) When an $i^{th}$ calculation is performed, the size of the outlier input vector and a value of i are compared. At this time, when i is smaller, that is, when there is an $i^{th}$ value of the outlier input vector, the vector product calculation for the value (fp16) of the $i^{th}$ outlier input vector and the fp16 outlier weight are performed, and then, the result thereof is added to the matrix multiplication calculation result of (2).

(Embodiment 3-3) the calculation process of the W4A16 kernel is described again below.

Figure 9:
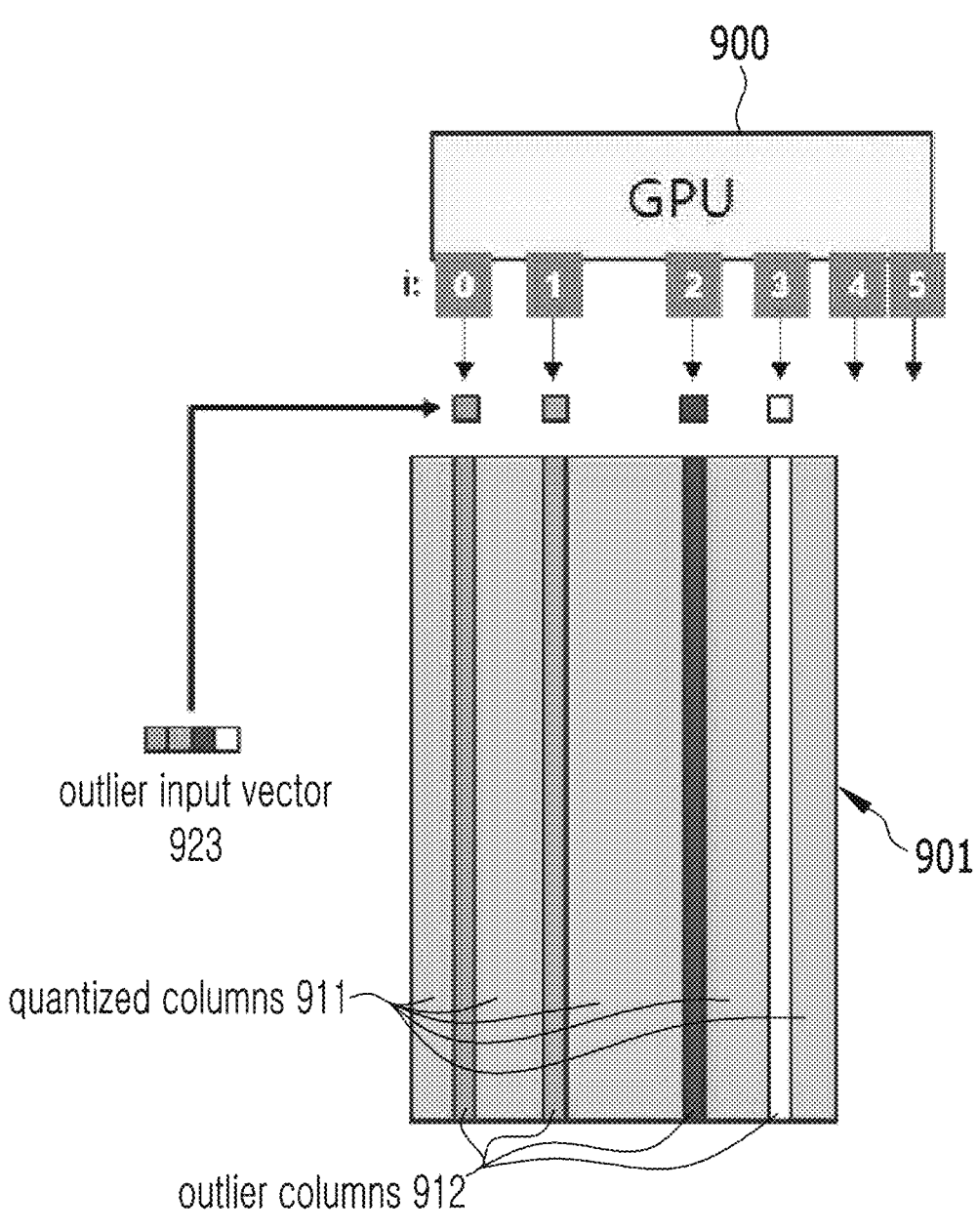
FIG. 9 illustrates an example of the calculation using the quantized weight matrix according to an embodiment of the disclosure.

FIG. 9 illustrates an example of the calculation using the quantized weight matrix according to an embodiment of the disclosure. A GPU 900 (for example, the processor 100 of FIG. 1) according to an embodiment of the disclosure may perform N (for example, 32) calculations in parallel at once. Specifically, the calculation (for example, 32 threads) in units of one warp may be performed at each step. Here, in each thread, one step is completed after calculations for the quantized part, that is, multiplication between the remaining values except for the outlier in the input vector is first performed by a specific size and then calculations for the outlier 923 are performed.

As shown in the example of FIG. 9, when the number of outlier columns 912 is four in a weight matrix 901, the length of an outlier input vector 923 is 4. At this time, since the GPU 900 performs 32 calculations in parallel, only four calculations are allocated to process the outlier input vector 923, and the remaining 28 calculations is in a waiting state while the four calculations are performed. When an index of the calculation is i, i<4 (=the size of the outlier vector) while the calculations of i=0 to 3 are performed.

That is, due to the characteristic of the calculation of the GPU 900, the index i increases from 0 to 31, from 32 to 63, from 64 to 99, . . . at each step. Indexes larger than or equal to 32 may be understood as the result of modulo 32 (for example, 32 mod 32=0). Accordingly, the GPU 900 first performs calculations using the quantized columns 911 for each index and, when the index i is smaller than the size of the outlier input vector 923, performs calculations using outlier columns 912. On the other hand, when the index i is larger than the outlier input vector 923, the GPU 900 waits for completion of the calculation using the outlier columns 912.

Figure 10:
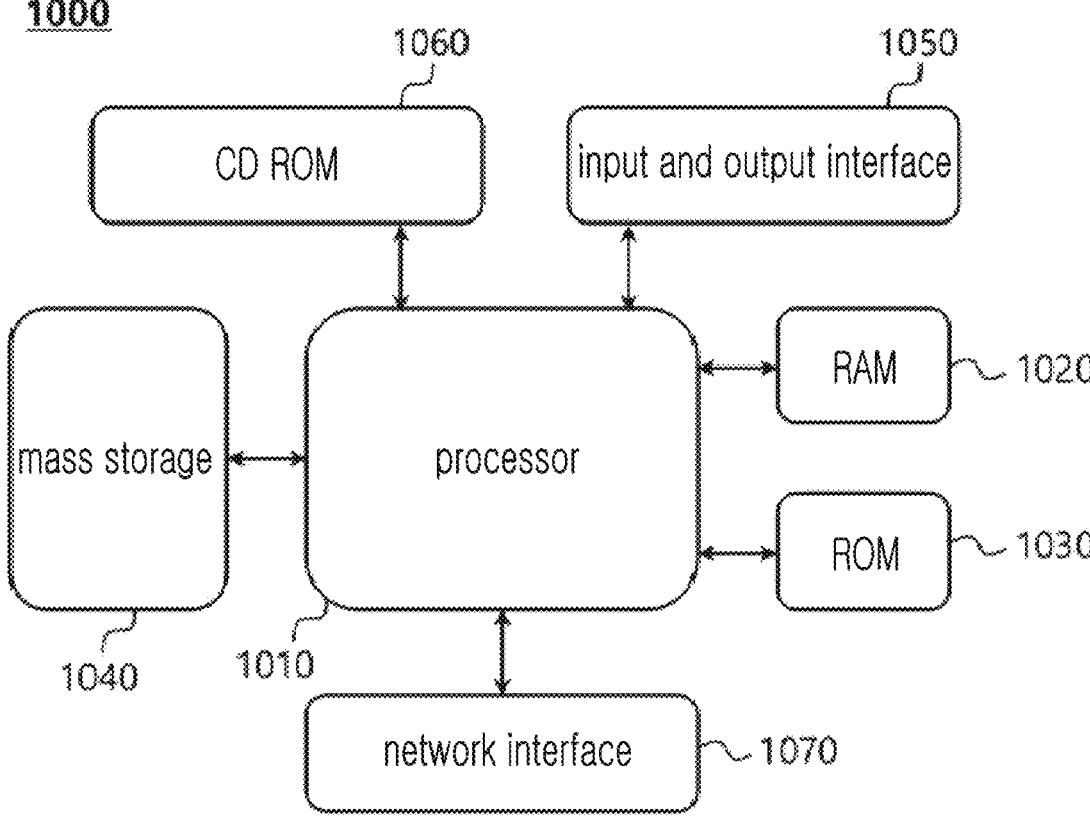
FIG. 10 is a block diagram illustrating the inside of a universal computer device which can be adopted to perform lightweighting of artificial intelligence models according to an embodiment of the disclosure.

Last, FIG. 10 is a block diagram illustrating the inside of a universal computer device which can be adopted to make artificial intelligence model lightweight according to an embodiment of the disclosure. A computer device 1000 includes one or more processor 1010 connected to a main memory device including random access memory (RAM) 1020 and read only memory (ROM) 1030. The processor 1010 may also be called a central processing unit (CPU). The processor is a component for performing a learning method and may be the subject of learning. As widely known in this technical field, the ROM 1030 serves to transmit data and instructions to the CPU unidirectionally, and the RAM 1020 is generally used to transmit data and instructions bidirectionally. The RAM 1020 and the ROM

1030 may include any appropriate form of computer-readable media. A mass storage 1040 is bidirectionally connected to the processor 1010 to provide additional data storage capabilities, and may be any type of the computer-readable recording media. The mass storage 1040 is used to store programs, data, and the like, and is an auxiliary storage device such as a hard disk generally slower than the main storage device. A specific mass storage such as CD ROM 1060 may be used. The processor 1010 is connected to one or more input and output interfaces 1050 such as a video monitor, a trackball, a mouse, a keyboard, a microphone, a touch screen-type display, a card reader, a magnetic or paper tape reader, a voice or writing recognizer, a joystick, or other known computer input and output devices. Last, the processor 1010 may be connected to a wired or wireless communication network through a network interface 1070. Through the network connection, the procedure of the method may be performed. The device and tool are well known to those skilled in the computer hardware and software technology fields.

Through the proposed technology, it is possible to significantly reduce the performance degradation caused by the quantization compared to the existing method by adding a negligible amount of capacities. Further, it is possible to mathematically describe the influence of the outlier generated in activation on quantization of weights, and it is possible to efficiently use the proposed mixed precision scheme through implementation of the efficient GPU kernel. The overhead of the actual calculation speed that occurs may be minimized.

In the specification (particularly, in the claims) of the disclosure, the term "the" and the indication term similar thereto may correspond to both the singular and the plural. When the range is described in the disclosure, it includes the disclosure applying individual values belonging to the range (unless there is a contrary description), and each individual value constituting the range is as described in the detailed description of the disclosure.

If there is no explicit order or contrary to the steps constituting the method according to the disclosure, the steps may be carried out in a suitable order. The disclosure is not necessarily limited to the described order of the steps. The use of all examples or exemplary terms (for example, etc.) in the disclosure is merely to describe the disclosure in detail, and the scope of the disclosure is not limited by the examples or exemplary terms unless defined by the claims. Further, those skilled in the art appreciates that various modifications, combinations, and changes can be made in accordance with design conditions and factors within the scope of the appended claims or their equivalents.

Therefore, the technical idea of the disclosure should not be limited to the above-described embodiments, and all ranges equivalent to the appended claims or equivalently changed therefrom as well as the appended claims are included in the scope of the spirit of the disclosure.

What is claimed is:
1. A method of lightweighting of artificial intelligence models, the method comprising:
    identifying, during execution of a GPU kernel, an outlier in an input vector of a layer;
    identifying, during execution of a GPU kernel, at least one column corresponding to the outlier in a weight matrix;
    quantizing, during execution of a GPU kernel, weight values of columns which do not correspond to the outlier so as to reduce device-side memory traffic and preserve kernel throughput; and uploading data of the quantized weight values of columns to a memory, wherein the outlier is one or more values identified from a result of a matrix multiplication of the input vector and the weight matrix, wherein the identifying the outlier comprises generating a Hessian value based on a product of the input vector and a transpose of the input vector, calculating sensitivity for each channel using a diagonal component of the Hessian value and a difference between weight values before and after quantization, and selecting the outlier based on the sensitivity, and wherein the method is executed by a processor configured to perform N-parallel operations, those related to the outlier are preferentially allocated to threads having lower indexes, where N is a natural number indicating the number of threads.

2. The method of claim 1, wherein the identifying further comprises identifying at least one element in the input vector having a value greater than or equal to a threshold value relative to an average of values included in the input vector.

3. The method of claim 1, wherein the identifying the outlier in the input vector of the layer comprises:

generating the Hessian value by using the input vector;

determining the sensitivity for each channel, based on the Hessian value; and identifying a weak column corresponding to the outlier based on the sensitivity, and excluding the weak column from quantization to preserve model accuracy.

4. The method of claim 3, wherein the weak column is maintained at full bit precision to preserve model accuracy.

5. A method of processing input data by using lightweight artificial intelligence models, the method comprising:

acquiring, during execution of a GPU kernel, an input data vector;

dividing, during execution of a GPU kernel, the input data vector into a first partial vector corresponding to quantized columns of a weight matrix and a second partial vector corresponding to at least one weak column of the weight matrix;

performing calculations, during execution of a GPU kernel, for the first partial vector by using the quantized columns;

performing calculations, during execution of a GPU kernel, for the second partial vector by using the at least one weak column;

adding, during execution of a GPU kernel, results of the calculations for the first partial vector and the second partial vector; and uploading data of the results of the calculations to a memory so as to reduce device-side memory traffic and preserve kernel throughput, wherein the weight matrix comprises weights of at least one column corresponding to an outlier in the input data vector and weights of at least one remaining column, wherein the outlier is one or more values identified from a result of a matrix multiplication of the input data vector and the weight matrix, and is determined based on a descending order of magnitudes of the values, wherein bit precision used for the weights of the at least one column and bit precision used for the weights of the at least one remaining column are different from each other, wherein the input data vector is processed by a processor configured to perform N-parallel operations, wherein the N-parallel operations are indexed from 0 to N-1, and among the N-parallel operations, those related to the outlier are preferentially allocated to threads having lower indexes, where N is a natural number indicating the number of threads.

6. The method of claim 5, wherein the performing the calculations for the first partial vector comprises:

dequantizing weights stored in the quantized columns; and performing a matrix multiplication between the dequantized weights and the first partial vector.

7. The method of claim 5, wherein the weight matrix is stored as:

a first partial matrix including the quantized columns, a second partial matrix including the weak columns, a first index table identifying columns included in the first partial matrix, and a second index table identifying columns included in the second partial matrix, wherein the first index table and the second index table enable efficient memory access.

8. An apparatus for lightweighting of artificial intelligence models, the apparatus comprising:

a storage unit; and a processor, wherein the processor is configured to:

identify, during execution of a GPU kernel, an outlier in an input vector of a layer;

identify, during execution of a GPU kernel, at least one column corresponding to the outlier in a weight matrix;

quantize, during execution of a GPU kernel, weight values of columns which do not correspond to the outlier configured to minimize overhead of the actual calculation speed of the artificial intelligence models operated in a GPU kernel; and upload data of the quantized weight values of columns to the processor, wherein the processor is configured to generate a Hessian value based on a product of the input vector and a transpose of the input vector, calculate sensitivity for each channel using a diagonal component of the Hessian value and a difference between weight values before and after quantization, and select the outlier based on the sensitivity, and wherein the processor performs N-parallel operations, those related to the outlier are preferentially allocated to threads having lower indexes, where N is a natural number indicating the number of threads.

9. An apparatus for processing input data, the apparatus comprising:

a storage unit; and a processor, wherein the processor is configured to:

acquire, during execution of a GPU kernel, an input data vector;

divide, during execution of a GPU kernel, the input data vector into a first partial vector corresponding to quantized columns of a weight matrix and a second partial vector corresponding to at least one weak column of the weight matrix;

perform calculations, during execution of a GPU kernel, for the first partial vector by using the quantized columns;

perform calculations, during execution of a GPU kernel, for the second partial vector by using the at least one weak column;

add, during execution of a GPU kernel, results of the calculations for the first partial vector and the second partial vector; and upload data of the results of the calculations to a memory configured to minimize overhead of the actual calculation speed of the artificial intelligence models operated in the GPU kernel, wherein an outlier is one or more values identified from a result of a matrix multiplication of the input data vector and the weight matrix, and is determined based on descending order of value magnitudes, wherein the processor is configured to generate a Hessian value using a product of the input data vector and a transpose of the input data vector, calculate sensitivity for each channel using a diagonal component of the Hessian value and a difference between pre-and post-quantization weight values, and determine at least one weak column based on the sensitivity, wherein the processor is further configured to operate N-parallel operations, those related to the outlier are preferentially allocated to threads having lower indexes, where N is a natural number indicating the number of threads, and wherein bit precision used for the weights of the at least one column and bit precision used for the weights of at least one remaining column are different from each other.

\* \* \* \* \*